(12) United States Patent
Kukade et al.

(10) Patent No.: US 10,344,220 B2
(45) Date of Patent: Jul. 9, 2019

(54) METHODS AND APPARATUS FOR FLUID CATALYTIC CRACKING

(71) Applicant: HINDUSTAN PETROLEUM CORPORATION LIMITED, Mumbai Maharashtra (IN)

(72) Inventors: Somanath Kukade, Bangalore (IN); Pramod Kumar, Bangalore (IN); Venkata Chalapathi Rao Peddy, Bangalore (IN); Venkateswarlu Choudary Nettem, Bangalore (IN)

(73) Assignee: Hindustan Petroleum Corporation Ltd., Bangalore (IN)

( * ) Notice: Subject to any disclaimer, the term of this patent is extended or adjusted under 35 U.S.C. 154(b) by 0 days.

(21) Appl. No.: 15/522,092

(22) PCT Filed: Jun. 7, 2016

(86) PCT No.: PCT/IN2016/050172
§ 371 (c)(1),
(2) Date: Apr. 26, 2017

(87) PCT Pub. No.: WO2017/068599
PCT Pub. Date: Apr. 27, 2017

(65) Prior Publication Data
US 2018/0223193 A1    Aug. 9, 2018

Related U.S. Application Data

(63) Continuation of application No. PCT/IN2016/050172, filed on Jun. 7, 2016.

(30) Foreign Application Priority Data

Oct. 21, 2015   (IN) .......................... 3993/MUM/2015

(51) Int. Cl.
*C10G 11/18* (2006.01)
*B01J 8/26* (2006.01)
(Continued)

(52) U.S. Cl.
CPC ............... *C10G 11/182* (2013.01); *B01J 8/26* (2013.01); *B01J 8/388* (2013.01); *B01J 29/90* (2013.01);
(Continued)

(58) Field of Classification Search
CPC .................................. B01J 8/26; B01J 8/388
See application file for complete search history.

(56) References Cited

U.S. PATENT DOCUMENTS 3,993,556 A * 11/1976 Reynolds ................... B01J 8/26
                                                                208/75
4,402,913 A *  9/1983 McKinney ........... C10G 11/187
                                                                208/74
(Continued)

FOREIGN PATENT DOCUMENTS

EP       1072855 A1    1/2001

OTHER PUBLICATIONS

International Search Report, dated Dec. 16, 2016 (PCT/IN2016/050172).

*Primary Examiner* — Randy Boyer
(74) *Attorney, Agent, or Firm* — Robert L. Stearns; Dickinson Wright, PLLC

(57) ABSTRACT

Methods and apparatus for fluid catalytic cracking (FCC) of a hydrocarbon feedstock includes a first reactor (1), a second reactor (2), and a regenerator assembly (3) shared and connected with the two reactors. The regenerator assembly (3) includes a regenerator vessel which has a partition (17) dividing the regenerator vessel into a first subunit (18) and a second subunit (19); a plurality of regenerator inlets for
(Continued)

receiving a first spent catalyst and second spent catalyst by the first subunit (18) and the second subunit (19); a plurality of regenerator inlet for receiving a first spent catalyst and a second spent catalyst by the first subunit (18) and the second subunit (10) respectively; an air controller (15) to allow for has flow to an air distributor (16) for supply of the gas to the first subunit (18) and the second subunit (19) to combust coke deposited on the first and the second spent catalyst, separately, to a desired degree to generate a fully and a partially regenerated catalyst.

6 Claims, 2 Drawing Sheets

(51) Int. Cl.
*B01J 8/38* (2006.01)
*B01J 29/90* (2006.01)
*B01J 38/06* (2006.01)

(52) U.S. Cl.
CPC ........ *B01J 38/06* (2013.01); *B01J 2208/0053* (2013.01); *B01J 2208/0084* (2013.01); *B01J 2208/00938* (2013.01); *C10G 2300/708* (2013.01)

(56) References Cited

U.S. PATENT DOCUMENTS

| | | | | |
|---|---|---|---|---|
| 4,436,613 | A | * | 3/1984 | Sayles .................. C10G 11/182 208/155 |
| 4,690,802 | A | * | 9/1987 | Jenkinson ............. B01J 8/1836 165/104.16 |
| 5,198,397 | A | | 3/1993 | Raterman |
| 2003/0143126 | A1 | | 7/2003 | Samson |
| 2013/0001131 | A1 | | 1/2013 | Chen |
| 2013/0172643 | A1 | | 7/2013 | Pradeep et al. |
| 2013/0248420 | A1 | * | 9/2013 | Palmas ..................... B01J 8/26 208/74 |

* cited by examiner

METHODS AND APPARATUS FOR FLUID CATALYTIC CRACKING

BACKGROUND

1. Technical Field

The present invention generally relates to fluid catalytic cracking, and particularly, but not exclusively, to regenerating a spent catalyst for the fluid catalytic cracking of hydrocarbon feedstock.

2. Related Art

Fluid Catalytic Cracking (FCC) process is a widely used process to convert a heavy hydrocarbon feedstock, such as atmospheric gas oils, vacuum gas oils, topped crudes, residuum, and the like, into lighter, more valuable products, such as olefins, Liquid Petroleum Gas (LPG), gasoline, light cycle oil, and the like. In the FCC process, a hydrocarbon feedstock of a high boiling point range is pre-heated and then brought into contact with a hot cracking catalyst in a catalytic cracking reactor, usually a riser. The hydrocarbon feedstock is cracked into lower boiling products (middle distillates), such as dry gas, LPG, gasoline, and light olefins, such as propylene and butylene.

This catalytic cracking process causes deposition of coke and other non-volatile products on the catalyst resulting in formation of a spent catalyst, which interferes with the catalyst's ability to promote the catalytic cracking process. Therefore, the spent catalyst is passed to a regenerator to restore the catalytic activity of the catalyst. The regeneration of the spent catalyst generates sufficient heat and increases the temperature of the catalyst. The hot catalyst that is thus regenerated is directed back to the catalytic cracking reactor for the cracking process and is utilized to carry out the endothermic catalytic cracking.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
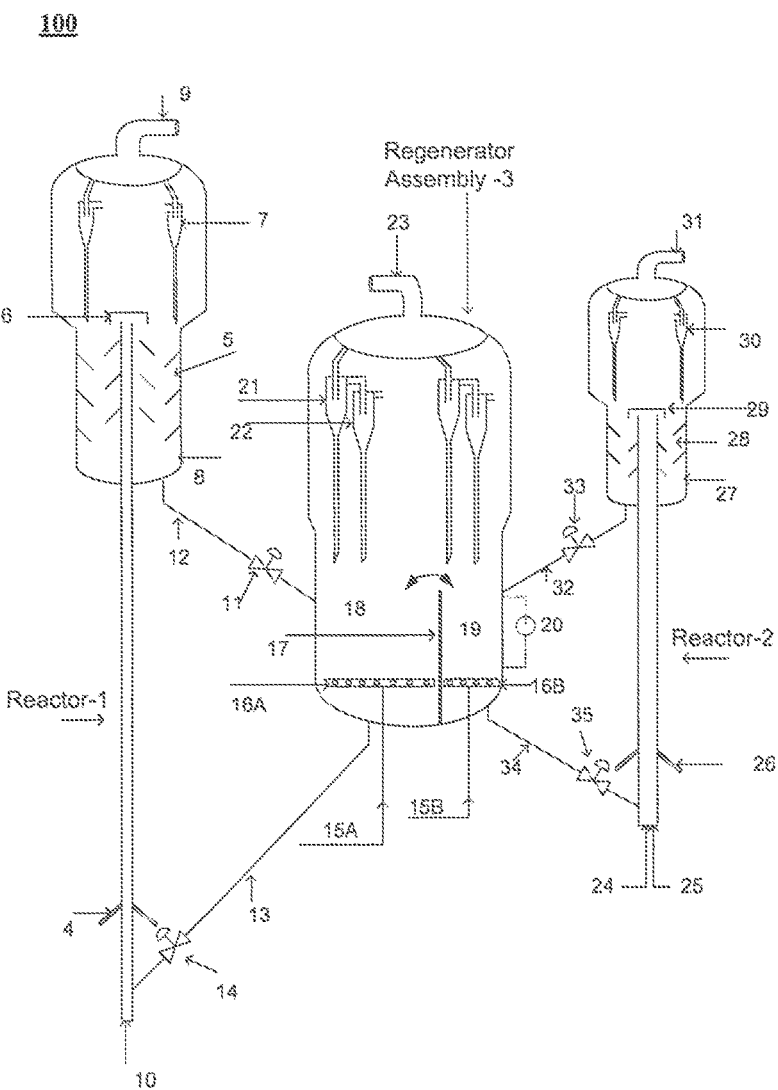
FIG. 1 illustrates an apparatus for fluid catalytic cracking of a hydrocarbon feedstock, in accordance with an implementation of the present subject matter.

Generally, a catalyst used in a Fluid Catalytic Cracking (FCC) process passes through an average of 10,000 to 50,000 cycles of regeneration in its lifecycle. The catalyst in each cycle of regeneration occupies a residence time in a range of 2-5 minutes in the regenerator, where the residence time is determined based on the coke content present on the catalyst's surface, and on the desired degree of regeneration. Greater the coke content on the catalyst's surface, greater is the residence time require for regeneration of the catalyst. A longer residence time, in some cases, contributes to the thermal deactivation of the catalyst in the regenerator, whereas a shorter residence time can cause incomplete combustion/regeneration of the catalyst. Several reactor configurations have been disclosed to address the issue of catalyst deactivation, higher catalyst residence time in the regenerator, and to improve combustion efficiency.

Conventionally, a single stage regenerator was used along with a single stage riser reactor in the FCC process for conversion of the hydrocarbon feedstock to the light olefins. In this method, a hot regenerated catalyst from the regenerator is withdrawn and fed into the reactor for catalytic cracking of the hydrocarbon feedstock. The method was associated with a number of drawbacks including increased coke deposition, reduced yield, and increased time for catalyst regeneration.

In certain other conventional reactor configurations, two riser reactors, each connected to an independent regenerator, is deployed in the FCC process to maximize the quality and yield of desired products. In this method, the spent catalyst arising out of each riser reactor is directed to the regenerator connected to that riser for regenerating the spent catalyst arising from that riser. However, the use of an independent, separate regenerator for each riser reactor is associated with significant added cost of investment.

To overcome the drawbacks associated with existing reactor configurations, multiple catalytic cracking reactor units with a single regenerator have been used in refining industries to reduce costs, and also maximize yield and quality of the desired products. Such reactor configurations include a single regenerator which is connected to multiple catalytic cracking reactors, where each of the multiple catalytic cracking reactors have a different feed input and are subjected to operating conditions with varying severity. The spent catalyst arising from each of the multiple catalytic cracking reactors was fed into the regenerator for regeneration of the spent catalyst. However, utilization of multiple catalytic cracking reactors under varying severity and with different feed input is likely to produce spent catalysts with wide variation in coke content. Therefore, if the spent catalyst from multiple catalytic cracking reactors, each with varied coke content, is fed to into the regenerator for regeneration, an unwanted over exposure of spent catalyst of lower coke content may occur, leading to accelerated deactivation of the catalyst.

The present subject matter describes apparatus and methods for regeneration of a spent catalyst for fluid catalytic cracking process of hydrocarbon feedstock. For this purpose, the apparatus includes two reactor units, i.e., a first reactor and a second reactor, each of which is coupled to a regenerator assembly. In an example, the first reactor and the second reactor are used for fluid catalytic cracking of the hydrocarbon feedstock for the production of middle distillates (cracked hydrocarbon feedstock) and light olefins. During the catalytic cracking process, the first reactor and the second reactor may generate a first spent catalyst and a second spent catalyst, each with varied coke content, along with other desired products. Although the description herewith provided is with reference to a two reactor units, it may be understood by a person skilled in the art that the disclosed methods and apparatus can include any number of multiple reactor units, albeit with a few variations.

The first spent catalyst and the second spent catalyst, which may together be referred as a spent catalyst, are directed to a regenerator assembly for regeneration of the spent catalyst. The regenerator assembly comprises a regeneration vessel, where the regenerator vessel includes a partition to divide the regenerator vessel into two subunits, i.e., a first subunit and a second subunit. The spent catalysts generated from the two reactors are fed into the first subunit and the second subunit respectively for regeneration at a controlled rate. Further an air controller, within the regenerator assembly, allows for gas/air flow into the first subunit and the second subunit at a controlled rate, to combust coke deposited on the first spent catalyst and the second spent catalyst to a desired degree. The degree of regeneration is dependent on the air flow, the coke content on the spent catalyst and the operating conditions within the regenerator assembly. In an example, the first subunit generates a fully regenerated catalyst and the second subunit generates a partially regenerated catalyst.

The apparatus of the present subject matter, where one regenerator assembly is shared by two reactor units to regenerate the spent catalysts arising from each catalytic cracking reactor is associated with significant reduction in cost of investment for operation of the regenerator assembly. Also, the incorporation of a partition to create two subunits in the regenerator vessel allows for regeneration of the spent catalysts having varied coke content, in separate subunits, to a desired degree. This also avoids the drawback of unwanted exposure of the spent catalyst to unsuitable regenerator conditions, which would otherwise result in metal deactivation of catalyst.

The following detailed description describes a fluid catalytic cracking (FCC) apparatus and its uses in detail. While the aspects of the FCC apparatus can be implemented in any number of different applications and configurations, the FCC apparatus of the present subject matter is described in the context of the following exemplary embodiments.

FIG. 1 illustrates a Fluid Catalytic Cracking (FCC) apparatus, herein referred to as an apparatus 100, in accordance with an embodiment of the present subject matter. The apparatus includes a first reactor 1, a second reactor 2, and a regenerator assembly 3, that is connected with the first reactor 1 and the second reactor 2. Hot regenerated catalyst flows, from the regenerator assembly 3, using slide valve 14 through a regenerated catalyst standpipe 13 to the first reactor 1. The first reactor 1 may be any one of an up flow, down flow, inclined flow, turbulent bed, and a dense bed reactor.

In an example, the first reactor is an up flow riser reactor terminating with a dense bed reactor at the top. In said example, the regenerated catalyst is introduced through the bottom of the first reactor 1. Further, in this example, the hydrocarbon feedstock which is pre-heated is fed through a feed nozzle 4, located at bottom of the first reactor 1. The feed nozzle 4 atomizes the hydrocarbon feedstock into fine droplets. The hot, regenerated catalyst is lifted by steam 10 in an acceleration zone, till the feed nozzle 4 section where it comes in contact with the hydrocarbon feedstock and causes cracking to produce a cracked hydrocarbon feedstock. In an example, the first reactor 1 is maintained under first set of operating conditions to allow the cracking process to occur. The first set of operating conditions include two or more of: a reactor temperature in a range of 550 to 600° C., catalyst to oil ratio in a range of 10 to 20 wt/wt, a riser residence time in a range of 2 to 5 seconds, a riser velocity in a range of 12 to 20 m/s, and a reactor pressure in a range of 0.5 to 2 $kg/cm^2$.

The cracking process results in deposition of coke on the catalyst resulting in formation of a first spent catalyst. The first spent catalyst and the cracked hydrocarbon feedstock are separated in riser termination device 6. In an example, the riser termination device 6 terminates in the dense bed portion of the first reactor 1 at the top. In another example, reactor cyclones 7 may be used to separate the first spent catalyst from the cracked hydrocarbon feedstock. The separated spent catalyst which is substantially free from the cracked hydrocarbon feedstock is fed back to the dense bed portion of the reactor. Cracked hydrocarbon exits through a reactor vapor line 9. The first spent catalyst along with any hydrocarbon trapped in it is stripped in stripper 5 by stripping steam. The stripper section 5 also has a provision of recycle stream 8. The first spent catalyst is then fed into the regenerator assembly 3, at subunit 18, through slide valve 11 by way of a spent catalyst standpipe 12 for regeneration of the first spent catalyst.

Further, a partially regenerated catalyst flows from section 19 to the second reactor 2 using slide valve 35 by means of a standpipe 34. The second reactor 2 may be either in sequence or parallel to the first reactor 1. Further, the second reactor 2 may include any one of an up flow, down flow, inclined flow, turbulent bed, and a dense bed reactor. In an example, the second reactor 2 is a dense bed reactor. The bottom of the second reactor 2 has a provision for $C_4$ stream injection 24 and lift steam 25. As is understood, $C_4$ is one of the products of the cracking process and typically includes $C_4$ hydrocarbons.

Further, cracked hydrocarbon feedstock e.g. light naphtha is injected through nozzles 26. The cracked hydrocarbon feedstock is re-cracked in presence of partially regenerated catalyst, steam, and $C_4$ stream, to generate a second spent catalyst and light olefins. In an example, the reactor 2 is operated under a second set of operating conditions that include reactor temperature in a range of 600 to 625° C., and a Weight Hourly Space Velocity (WHSV) in a range of 0 to 40 $hr^{-1}$.

The entrained catalyst along with the light olefin vapors are separated in reactor cyclones 30. The vapors exit through reactor vapor line 31. The second spent catalyst is stripped in stripper 28 by stripping steam and stripped spent catalyst flows to the regenerator assembly 3 by the spent catalyst standpipe 32 using slide valve 33. The stripper section 28 has also provision of heavy oil or clarified oil (CLO) recycle 27. The spent catalyst and the cracked hydrocarbon feedstock are separated in riser termination device 29.

The first spent catalyst and the second spent catalyst, which may be referred together as a spent catalyst in some instances, are fed into the regenerator assembly 3 through two or more regenerator inlets. The spent catalyst entrained along with flue gas is separated in primary cyclones 21 and secondary cyclones 22 housed in the regenerator assembly 3, after which the flue gas exits through flue gas line 23. The spent catalysts are further fed back into the regenerator assembly 3 for regeneration of the spent catalysts. The regenerator assembly 3 is a single unit which is connected to, and shared by, the first reactor 1 and the second reactor 2. The use of one regenerator assembly that is shared by two reactor units 1 and 2 to regenerate the spent catalysts arising from each catalytic cracking reactor to different degrees of regeneration is associated with significant reduction in cost of investment and operation of the regenerator assembly 3.

The regenerator assembly 3 includes a regenerator vessel which includes partition 17 which divides the regenerator vessel into two subunits. i.e., a first subunit 18 and a second subunit 19. The partition 17 may be created by use of any structural elements like internal vessel or baffles. In an example, one of the two subunits is for partial regeneration of the spent catalysts and the other subunit from the two subunits is for full regeneration of the spent catalysts. For this purpose, the spent catalyst generated from the first reactor 1, i.e., the first spent catalyst may be received by the first subunit 18, through one or more inlets from the regenerator vessel, for full regeneration of the first spent catalyst. Likewise, the second spent catalyst is fed into the second subunit 19 for partial regeneration of the second spent catalyst.

In an example, the regenerator assembly 3 allows for overflow of excess spent catalyst from one subunit to the other subunit. In yet another example, the spent catalysts may be received by either of the subunits for regeneration. In another example, the first subunit 18 and the second subunit 19 receive the spent catalysts based on level of the coke content, where each subunit is configured to receive the spent catalyst with the coke content in a pre-determined range.

The regenerator assembly 3 further comprises air controller 15A and 15B, together referred to as 15, to allow for gas flow into the first subunit 18 and the second subunit 19 to burn or combust at least a portion of coke present on the spent catalysts in the presence of air. The air controller 15 further controls the air flow into each subunit to ensure that each of the spent catalyst is regenerated to a desired degree. The degree of regeneration also depends on residence time of the spent catalysts in the regenerator assembly 3, regenerator conditions including the air flow, and the coke content on the spent catalysts. Greater is the residence time of the spent catalysts in the regenerator assembly 3 under operating regenerator conditions, greater is the degree of regeneration.

The inventory, i.e., spent catalyst present at a point in time, in the section 19 is controlled by level 20 and is regenerated in controlled air environment for partial regeneration off the spent catalyst in subunit 19. The air controller 15A and 15B, together referred to as 15, to regulate the gas flow to air distributor 16A and 16B for the first subunit and the second subunit, to combust at least a portion of coke deposited on the first spent catalyst and the second spent catalyst for regeneration. For discussion purposes, the air distributor 16A and 16B may be collectively referred to as air distributor 16. In an example, the regeneration is to generate a fully regenerated catalyst and a partially regenerated catalyst. The fully regenerated catalyst occupies a greater residence time in the regenerator assembly as compared to the partially regenerated catalyst. In an example, the partially regenerated catalyst has coke on catalyst in a range of 0.1 wt % to 0.4 wt %.

The regenerator assembly further includes two or more regenerator outlets for directing the fully regenerated catalyst and the partially regenerated catalyst to the first reactor 1 and the second reactor 2 respectively for catalytic cracking of the hydrocarbon feedstock for the production of cracked hydrocarbon feedstock (middle distillates) and the light olefins.

Figure 2:
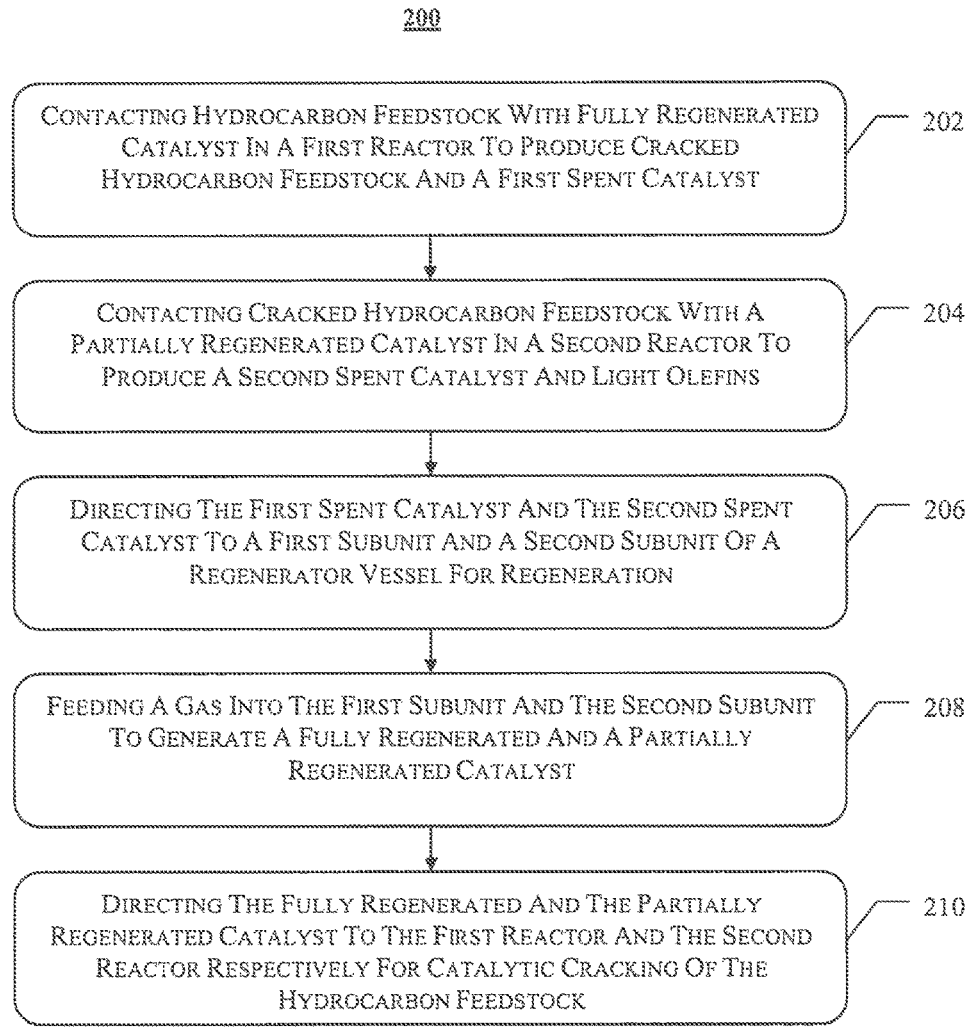
FIG. 2 illustrates a method for regenerating the spent catalyst for the fluid catalytic cracking of the hydrocarbon feedstock, in accordance with an implementation of the present subject matter.

FIG. 2 illustrates a method 200 for regenerating a spent catalyst for catalytic cracking of the hydrocarbon feedstock. It will be understood that method 200 is not limited to the sequence of steps described therein and some of the blocks of method 200 may be performed sequentially or in a different order without departing from the disclosed subject matter.

At block 202, the hydrocarbon feedstock is contacted in the presence of a fully regenerated catalyst in a first reactor to generate a cracked hydrocarbon product. Such a contact is performed under first set of operating conditions, that include a temperature range of 550° C. to 600° C., catalyst to oil ratio 10 to 20 wt/wt, riser residence time of 2 to 5 seconds, riser velocity of 12 to 20 m/s, and a reactor pressure in a range of 0.5 to 2 kg/cm$^2$(g). This contact results in deposition of coke on the catalyst, and the coked catalyst is herein referred to as a first spent catalyst. The first spent catalyst so obtained has high coke content due to severity of reaction conditions in the first reactor, feed quality, or a combination of both.

At block 204, a cracked hydrocarbon feedstock is fed into a second reactor for re-cracking in the presence of a partially regenerated catalyst to generate a second spent catalyst. The second reactor is maintained under a second set of operating conditions that include a temperature range of 600 to 625° C., and a WHSV in a range of 0 to 40/hr. Further, the cracked hydrocarbon feedstock is contacted with a partially regenerated catalyst in the second reactor to generate a second spent catalyst and, optionally, light olefins. In an example, the coke on the second spent catalyst is in a range of 0.1 wt % to 0.4 wt %. In yet another example, the coke content on the first spent catalyst and the second spent catalyst can be either same or different. In an example, the fully regenerated catalyst and the partially regenerated catalyst include catalyst compositions having different zeolite types either formed separately or blended in same catalyst. In an example, the non-zeolite material ranges in the catalytic composition are in a range of 70-95% in the catalyst. The first spent catalyst and the second spent catalyst produced from the first reactor and the second reactor, respectively, may be together referred to as a spent catalysts. The spent catalysts are stripped in their respective strippers to remove any entrapped hydrocarbons on the spent catalyst.

At block 206, the spent catalysts, i.e., the first spent catalyst and the second spent catalyst, with same or different coke contents, are respectively fed in to a first subunit and a second subunit of a regenerator vessel. The first subunit and the second subunit of the regenerator vessel are separated by a partition. In an example, the partition may be created by placing any structural elements, like baffles or an internal vessel.

At block 208, a gas is fed into the first subunit and the second unit to combust coke deposited in the first spent catalyst and the second spent catalyst to a desired degree. In an example, the first subunit and the second subunit separately regenerate the first spent catalyst and the second spent catalyst, respectively, to generate the fully regenerated catalyst and the partially regenerated catalyst. The degree of regeneration is dependent on the extent of gas flow into the first subunit and the second subunit, residence time, and coke content on the first spent catalyst and the second spent catalyst. In an example, greater the residence time, greater is the extent of regeneration of the spent catalyst.

At block 210, the fully regenerated catalyst and the partially regenerated catalyst are respectively directed to the first reactor and the second reactor for catalytic cracking of the hydrocarbon feedstock for the production of the middle distillates and light olefins The order in which the method 200 is described is not intended to be construed as a limitation, and the steps described can be combined in other ways obvious to a person skilled in the art. Additionally, individual blocks can be added or deleted from the method without departing from the disclosed present subject matter.

The present subject matter will now be illustrated with working examples, which is intended to illustrate the working of the present subject matter and not intended to be taken restrictively to imply any limitations on the scope of the present subject matter. Other examples are also possible which are within the scope of the present subject matter.

Hydrocarbon Feedstock:

Feed stock for the present subject matter includes a wide range of hydrocarbon feedstock such as hydrotreated Vacuum Gas Oil (VGO), Coker gasoline, CFO, VGO, hydro cracker bottom, Vacuum Residue, RCO, HVGO and their mixtures, etc. The detail properties of the hydrocarbon feed (hydrotreated VGO) are listed in Table 1.

TABLE 1

Feed Properties.

| Properties | Hydrotreated-VGO |
| --- | --- |
| Density at 15° C., gm/cc | 0.903 |
| Sulphur, wt % | 0.01 |
| CCR, wt % | <0.1 |
| Pour point, ° C. | 39 |
| Viscosity, cSt | 6.9374 |
| ASTM-7169 Distillation, wt % | |
| IBP | 250 |
| 5 | 338 |
| 10 | 362 |
| 30 | 410 |
| 50 | 443 |
| 70 | 481 |
| 90 | 537 |
| 95 | 561 |
| SARA, wt % | |
| Saturates | 51.6 |
| Aromatics | 42.1 |
| Resin | 6.3 |
| Asphaltenes | Nil |

Catalyst:

The catalyst compositions disclosed in the present subject matter have different zeolite types either formed separately or blended in same catalyst. Table 2 gives the comparison between normal FCC catalyst and the catalyst composition of the present invention. Non-zeolitic material is the combination of active as well as inactive material. Zeolite-1 has a pore size in the range of 7-8° A and is selected from group of USY, REUSY, Beta, and the like. Zeolite-2 has a pore size in the range of 5-6° A and is selected from the group of ZSM-5, ZSM-11, ZSM-22, SAPO-11, and the like, which is either modified with phosphorous, alkaline earth, Fe, Zn, or Mn to create mesoporosity.

TABLE 2

Comparison of Normal FCC catalyst and catalyst system of the present application (Zeolite content Basis).

| Parameter | Existing FCC Catalyst | Catalyst composition of the present subject matter |
| --- | --- | --- |
| Non Zeolitic material, wt % | 70-60 | 95-70 |
| Zeolite-1, wt % | 20-40 | 3-18 |
| Zeolite-2, wt % | 10-0 | 2-12 |

Typical Product Yields:

The typical product of the present invention is given in below Table 3. LPG yield of 40-45 wt % with propylene selectivity of 40-50 wt % is obtained.

TABLE 3

Product yields of the present subject matter

| Attribute | Yields, wt % |
| --- | --- |
| Coke | 4-7 |
| Dry Gas | 6-9 |
| LPG | 40-45 |
| C3= | 18-22 |

TABLE 3-continued

Product yields of the present subject matter

| Attribute | Yields, wt % |
| --- | --- |
| Gasoline(C5-221° C.) | 25-35 |
| LCO(221-343° C.) | 6-12 |
| Bottoms(343° C.+) | 0.5-7 |

Example 1

This example illustrates the combination of non-zeolite, zeolite-1 and zeolite-2. Zeolite-2 is introduced in the above combination to enhance light olefins. Table 4 shows cracking of hydrotreated Vacuum Gas oil (VGO) with combination of non-zeolite, zeolite-1, and zeolite-2 in the ratio 80:12:8.

TABLE 4

Product yields with catalyst system of the present subject matter

| Parameter | Non:Zeolite:Zeolite 1:Zeolite 2 |
| --- | --- |
| Composition, wt % | 80:12:8 |
| Cracking Temperature, ° C. | 570 |
| Catalyst-to-Oil, wt/wt | 12 |
| Conversion, wt % | 85 |
| Coke | 5.63 |
| Dry Gas | 8.29 |
| Ethylene | 5.72 |
| LPG | 41.05 |
| Propylene | 19.54 |
| C4 Olefins | 13.87 |
| Gasoline | 30.03 |
| LCO | 9.35 |
| Bottoms | 5.65 |

Example 2

This example illustrates the effect of cracking recycle streams like light naphtha and C4 stream in dense bed riser at reaction temperature of 600° C. Light olefins can be further maximized by this option in the FCC configuration of the present invention. The results give delta increase in ethylene, propylene, and butylenes are shown in Table 5.

TABLE 5

Results showing the delta increase in ethylene, propylene, and butylenes.

| Parameter | Non zeolite:zeolite-1:zeolite-2 |
| --- | --- |
| Composition, wt % | 80:12:8 |
| Delta Yields, wt %: | |
| Ethylene | +0.32 |
| Propylene | +1.91 |
| Butylenes | +0.52 |

Although the subject matter has been described in considerable detail with reference to certain examples and implementations thereof, other implementations are possible as would be understood by a person skilled in the art.

We claim:

1. An apparatus for fluid catalytic cracking (FCC) of a hydrocarbon feedstock, the apparatus comprising:
 a first reactor, wherein the first reactor is an up-flow dilute riser terminating in a dense bed portion at the top for the catalytic cracking of heavy hydrocarbon feedstock and is maintained under a first set of operating conditions, wherein the first reactor generates a first spent catalyst;

a second reactor, wherein the second reactor is an up-flow dense bed riser reactor for the catalytic cracking of light hydrocarbon feedstock and is maintained under a second set of operating conditions, wherein the second reactor generates a second spent catalyst; and a regenerator assembly coupled to, and shared by, the first reactor and the second reactor, wherein the regenerator assembly comprises:

a single regenerator vessel comprising a vertical internal baffle partition to divide the regenerator vessel into a first subunit and a second subunit, wherein the partition allows for overflow of excess spent catalyst between the two subunits;

a plurality of regenerator inlets in the regenerator vessel for receiving the first spent catalyst by the first subunit and the second spent catalyst by the second subunit, for regenerating the first spent catalyst and the second spent catalyst, respectively;

an air distributor within the regenerator vessel for supply of air to the first subunit and the second subunit;

an air controller to control air flow to the air distributor to generate a fully regenerated catalyst and a partially regenerated catalyst in the first subunit and the second subunit, respectively;

a first regenerator outlet in the regenerator vessel for directing the fully regenerated catalyst from the first subunit to the first reactor and a second regenerator outlet in the regenerator vessel for directing the partially regenerated catalyst from the second subunit to the second reactor for the catalytic cracking of hydrocarbon feed; and cyclones housed in the regenerator vessel to separate spent catalyst from entrained flue gases of the first and second subunits and remove the flue gases from the regenerator assembly.

2. The apparatus as claimed in claim 1, wherein the first spent catalyst has coke content greater than the coke content of the second spent catalyst.

3. The apparatus as claimed in claim 1, wherein the first set of operating conditions include: a reactor temperature in a range of 600° C., catalyst to oil ratio in a range of 10 to 20 wt/wt, a riser residence time in a range of 2 to 5 seconds, a riser velocity in a range of 12 to 20 m/s, and a reactor pressure in a range of 0.5 to 2 $kg/cm^2$ (g).

4. The apparatus as claimed in claim 1, wherein the second set of operating conditions include: a reactor temperature in a range of 600 to 625° C., and a WHSV in a range of 0 to 40 $hr^{-1}$.

5. The apparatus as claimed in claim 1, wherein the partially regenerated catalyst has coke on catalyst in a range of 0.1 wt % to 0.4 wt %.

6. The apparatus as claimed in claim 1, wherein the first regenerator outlet and the second regenerator outlet are independently controlled to vary a residence time of the first spent catalyst and the second spent catalyst in the subunits of the regenerator vessel so that the first spent catalyst occupies a greater residence time in the regenerator assembly as compared to the second spent catalyst to obtain the fully regenerated catalyst and the partially regenerated catalyst, respectively.

* * * * *